United States Patent
Chittar et al.

(10) Patent No.: US 10,628,431 B2
(45) Date of Patent: Apr. 21, 2020

(54) PREDICTING A TYPE OF A RECORD SEARCHED FOR BY A USER

(71) Applicant: salesforce.com, inc., San Francisco, CA (US)

(72) Inventors: Naren M. Chittar, San Jose, CA (US); Jayesh Govindarajan, Palo Alto, CA (US); Edgar Gerardo Velasco, San Francisco, CA (US); Anuprit Kale, San Francisco, CA (US); Francisco Borges, Voorburg (NL); Guillaume Kempf, Meylan (FR); Marc Brette, Montbonnot-Saint-Martin (FR)

(73) Assignee: salesforce.com, inc., San Francisco, CA (US)

( * ) Notice: Subject to any disclaimer, the term of this patent is extended or adjusted under 35 U.S.C. 154(b) by 193 days.

(21) Appl. No.: 15/481,366

(22) Filed: Apr. 6, 2017

(65) Prior Publication Data

US 2018/0293241 A1    Oct. 11, 2018

(51) Int. Cl.
*G06F 7/00* (2006.01)
*G06F 17/30* (2006.01)
*G06F 16/2457* (2019.01)
*G06N 20/00* (2019.01)
*G06N 5/00* (2006.01)
*G06F 16/242* (2019.01)
*G06N 20/20* (2019.01)
*G06N 7/00* (2006.01)
(Continued)

(52) U.S. Cl.
CPC ...... *G06F 16/24578* (2019.01); *G06F 16/243* (2019.01); *G06N 5/003* (2013.01); *G06N 20/00* (2019.01); *G06N 20/20* (2019.01); *G06N 3/02* (2013.01); *G06N 7/005* (2013.01); *G06N 20/10* (2019.01)

(58) Field of Classification Search
CPC .......... G06F 16/24578; G06F 16/9535; G06F 16/243; G06N 20/00; G06N 20/20
USPC .......................................... 707/748, 736, 769
See application file for complete search history.

(56) References Cited

U.S. PATENT DOCUMENTS 8,266,162 B2    9/2012  Cava
9,542,450 B1 *  1/2017  Jacobsson ........... G06F 16/9535
(Continued)

OTHER PUBLICATIONS

United States Office Action, U.S. Appl. No. 15/636,199, dated May 31, 2019, 12 pages.
(Continued)

*Primary Examiner* — Md I Uddin
(74) *Attorney, Agent, or Firm* — Fenwick & West LLP

(57) ABSTRACT

As part of providing the services to users, an online system stores multiple records that are accessible by users of the online system. When a user provides a search query, the online system extracts morphological and dictionary features from the query. The online system provides the extracted features to a machine learning model as an input. The machine learning model outputs a score for each potential entity type that indicates a likelihood that the search query is for a record associated with the entity type. The output from the machine learning model is used by the online system to select one or more entity types that the user is likely searching for. The online system searches the stored records based on the search query but limits the searching to records associated with at least one of the selected entity types.

19 Claims, 5 Drawing Sheets

(51) Int. Cl.
*G06N 3/02* (2006.01)
*G06N 20/10* (2019.01)

(56) References Cited

U.S. PATENT DOCUMENTS

| | | | |
|---|---|---|---|
| 2006/0184460 A1* | 8/2006 | Cleary | G06N 20/00 706/12 |
| 2007/0130137 A1 | 6/2007 | Oliver et al. | |
| 2008/0195595 A1 | 8/2008 | Masuyama et al. | |
| 2008/0215565 A1 | 9/2008 | Sun et al. | |
| 2011/0231347 A1 | 9/2011 | Xu et al. | |
| 2012/0078825 A1 | 3/2012 | Kulkarni et al. | |
| 2013/0024448 A1 | 1/2013 | Herbrich et al. | |
| 2013/0124505 A1 | 5/2013 | Bullotta et al. | |
| 2014/0222503 A1 | 8/2014 | Vijayaraghavan et al. | |
| 2016/0171537 A1* | 6/2016 | Fanous | G06F 16/9535 705/14.53 |
| 2017/0004409 A1* | 1/2017 | Chu | G06N 7/005 |
| 2018/0121533 A1* | 5/2018 | Magnani | G06F 16/9535 |
| 2018/0144051 A1* | 5/2018 | Stoyanov | H04L 67/306 |

OTHER PUBLICATIONS

United States Office Action, U.S. Appl. No. 15/636,199, dated Sep. 30, 2019, 14 pages.

* cited by examiner

300

302 Identify Historical Information Describing Previously Processed Search Queries

304 Generate Training Examples Based on the Historical Information

306 Train a Machine Learning Model Based on Morphological and Dictionary Features of the Training Examples

308 Receive a Search Query Provided by a User

310 Extract Morphological and Dictionary Features from the Search Query

312 Predict an Entity Type Based on the Machine Learning Model and the Extracted Features

314 Generate Search Results Based on the Predicted Entity Type

316 Transmit the Search Results to a Client Device of the User

FIG. 3

PREDICTING A TYPE OF A RECORD SEARCHED FOR BY A USER

BACKGROUND

Field of Art

The described embodiments pertain in general to databases, and in particular to machine learning techniques for predicting an entity type of a record searched for by a user.

Description of the Related Art

Online systems store records accessible by users. When a user is interested in accessing data stored by an online system but the user doesn't know the specific record that includes the data or the storage location of the record, the user typically submits a search query to the online system. The online system returns to the user search results that include records that are related to the search query.

To identify records related to the search query, the online system can make an individual determination for each stored record as to whether it is related to the search query and whether it should be included in the search results. However, for an online system that stores a large amount of records (e.g., a customer relationship management (CRM) system), using this process consumes a large amount of system resources (e.g., hardware resources). Additionally, processing such a query will take a long period of time and cause the user to have a negative experience with the online system.

SUMMARY

The embodiments described herein provide methods, computer program products, and computer database systems for predicting an entity type of a record searched for by a user using machine learning techniques. An online system provides users with access to online services. For example, the online system may be a web-based customer relationship management (CRM) system that provides employees of an enterprise with access to CRM software applications. As part of providing the services to users, the online system stores multiple records that are accessible by users of the online system. The records may be generated, for example, by users or administrators of the online system.

Records stored by the online system are associated with entity types. An entity type associated with a record describes a characteristic of the record or a segment to which the record has been assigned. As an example, a CRM system may store records associated with a user entity type because each record represents a user of the system, records associated with an account entity type because each record represents a sales account, and records associated with an opportunity entity type because each record represents a potential sale that has not yet been finalized. As another example, an online system may store records that are media items, such as videos, audio files, and still images. Each record is associated an entity type that indicates the type of media item of the record (e.g., a video, an audio file, or a still image). As an additional example, an online system may offer products for sale and store a different record (e.g., webpage) for each product. Each record is associated with an entity type that is a product category/department to which the respective product has been assigned.

To identify a record stored by an online system a user can provide a search query to the online system. When a user provides a search query, the online system extracts morphological and dictionary features from the query. Morphological features describe the structure of the search query and may include the number of words in the query, whether the query includes an email address, is the query comprised of only numbers, how many digits are included in the query if the query is only comprised of numbers, and whether the query includes a mix of letters and number. Dictionary features are determined based on dictionaries and include what percentage of words in the query are found in a language dictionary (e.g., English dictionary), what percent of the query is comprised of people names, what percent of the query is comprised of business names, and what percent of the query is comprised of business suffixes. In one embodiment, the online system also extracts user features associated with the user. For example, based on stored information about the user, the online system extracts a user feature that indicates top one or more entity types that the user interacts with or searches for through the online system.

The online system provides the extracted features to a machine learning model as an input. The machine learning model outputs a score for each entity type that indicates a likelihood that the search query is for a record associated with the entity type. In one embodiment, the machine learning model is a random forests model. The output from the machine learning model is used by the online system to select one or more entity types that the user is likely searching for. In one embodiment, the online system searches the stored records based on the search query but limits the searching to records associated with at least one of the selected entity types. For example, if there are fifty different entity types and the online system selects five entity types based on the machine learning model, the online system searches for records associated with at least one of the five entity types. By limiting the records searched, it improves the functionality of the online system in that the online system is able to process the search query faster and using less system resources (e.g., less processing power) than if the search was not limited. Further, by using less system resources to process a single search query, the online system is able to handle a larger number of search queries at once.

The records identified as being relevant to the search query are included in search results and provided to the user. In one embodiment, the output from the machine learning model is used to rank search results, where a record associated with an entity type that the user is more likely to be interested in is ranked higher than a record associated with an entity type that the user is less likely to be interested in.

The output from the machine learning model can also be used to suggest an entity type for the search query as the users enter the search query. For example, when a user enters part of a search query, the online system can receive the part of the search query, generate morphological and dictionary features, and provide the features to the machine learning model. The entity types that the user is most likely searching for, as determined based on the model, are suggested to the user for completing the search query as part of an autocomplete feature.

In one embodiment, for each search query provided by users, the online system tracks which record from the respective search results the user was interested in and the entity type of the record. Once a search query has been submitted to the online system more than a threshold number of times, the online system classifies the search query as a common query. The online system associates the common query with one or more entity types based on the tracked information. The entity types associated with the common query are the entity types that users have most often been interested in when providing the search query. When a user submits a search query, the online system determines whether the query is a common query. If the query is a common query, the online system predicts that the user is likely searching for one of the entity types associated with the common query. On the other hand, if the query is not a common query, the online system uses the machine learning model to predict the entity type that the user is searching for.

BRIEF DESCRIPTION OF DRAWINGS

FIG. 3 is a flow chart illustrating operations of the online system in processing a search query according to one embodiment.

Figure 1:
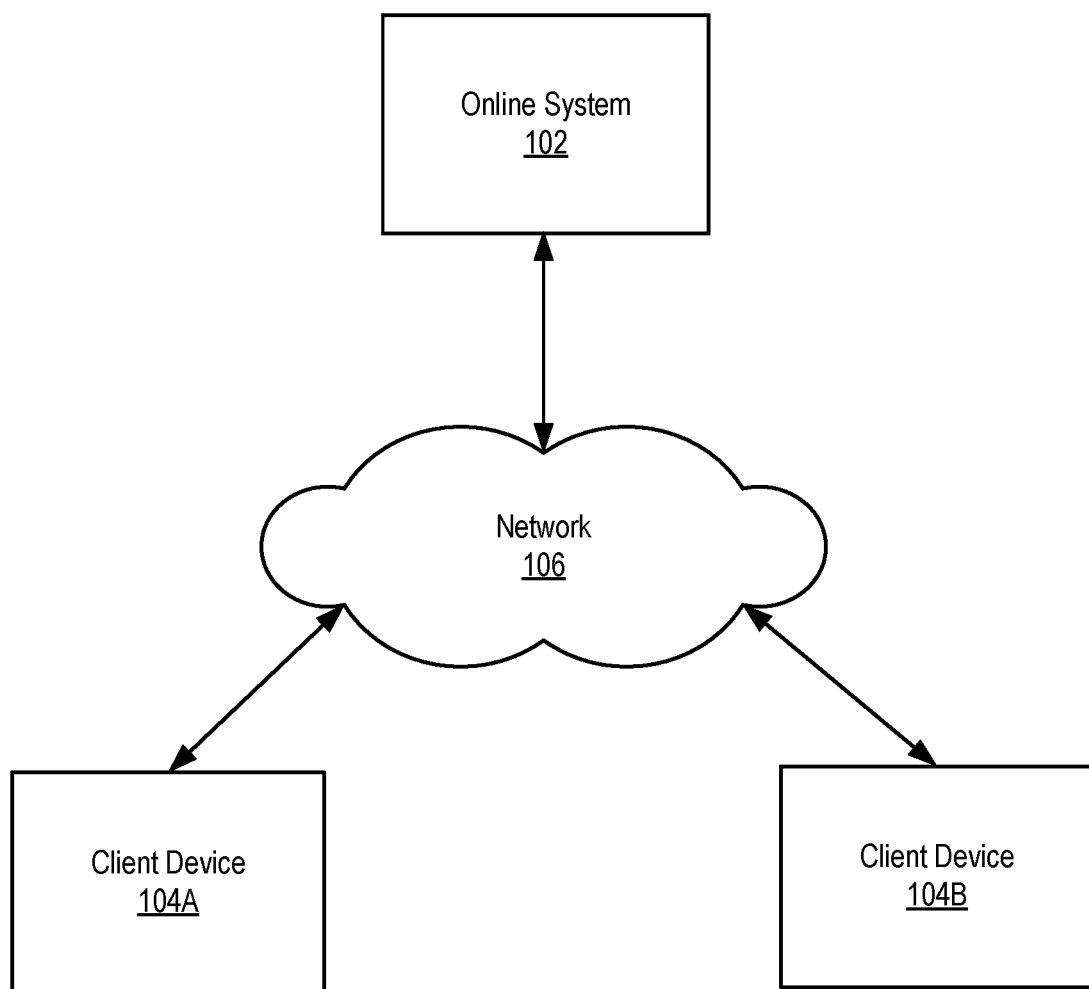
FIG. 1 is a block diagram of an online system environment according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

DETAILED DESCRIPTION

FIG. 1 is a block diagram of an online system environment 100 according to one embodiment. FIG. 1 illustrates an online system 102 and client devices 104A and 104B connected via a network 106. Although a select number of each entity are shown in FIG. 1, embodiments can have more or less of each entity (e.g., additional client devices 104).

The online system 102 is a computer system that provides services to users. In one embodiment, the online system 102 implements a web-based customer relationship management (CRM) system that provides users with CRM services. For example, in one embodiment, the online system 102 includes application servers configured to implement and execute CRM software applications. In other embodiments, the online system 102 provides other services or additional services that may include one or more of the following types of services: data storage, media hosting, online searching, social networking, shopping, advertising, news distribution, and so forth.

The online system 102 stores records or at least an index of records that are accessible by users through the online system 102. The online system 102 may also be referred to as a storage system. Records may be provided by users or system administrators to the online system 102 for storage. Records may include webpages, mobile application pages, media items (e.g., videos, audio files, still images), documents, forms, social posts, presentations, spreadsheets, text files, calendar entries, tasks, and other storable objects.

In one embodiment, the online system 102 is a multi-tenant system that stores records for multiple tenants. Each tenant may be an enterprise and the users that store and/or access stored records are associated with one of the enterprises (e.g., employees, contractors, or other representatives of an enterprise). For example, one tenant might be a company that employs a sales force where each salesperson communicates with the online system 102 to manage their sales process. Thus, a user might store records that comprise contact information, sale leads, sales opportunities, customer follow-up data, performance data, goals, progress data, calendar entries, tasks, documents, social information, contracts, etc. In one embodiment, the online system 102 implements security protocols that keep records, data, applications, and application use separate for different tenants.

Records accessible through the online system 102 are associated with one or more entity types. An entity type associated with a record describes a characteristic of the record or a segment (e.g., a category) to which the record has been assigned. The online system 102 stores a machine learning model that is trained to predict the entity type of a record that a user is searching for based on morphological and dictionary features of a search query provided by the user. In one embodiment, the machine learning model is a random forests model. Morphological features describe the structure of the query (e.g., number of words in the query, does the query only include words). Dictionary features are determined based on the use of one or more dictionaries (e.g., percentage of words in the query found in an English dictionary). In one embodiment, the machine learning model is also trained to predict the entity type based on user features that indicate information about the user that submitted the search query.

In one embodiment, the online system 102 uses the output from the machine learning model to make searching for records more efficient. When a user provides a search query, the online system 102 extracts morphological and dictionary features from the query and provides the features to the machine learning model as an input. Based on the output from the machine learning model, the online system 102 limits the searching to records associated with at least one of the entity types predicted by the model as an entity type that the user is searching for. In one embodiment, the online system 102 uses the output from the machine learning model to rank search results, where a record associated with an entity type that the user is more likely to be interested in is ranked higher than a record associated with an entity type that the user is less likely to be interested in.

In one embodiment, the online system 102 uses an output from the machine learning model as part of an autocomplete feature. As a user enters a search query, part of the search query that has already been entered by the user is received by the online system 102. The online system 102 provides morphological and dictionary features extracted from the part of the query to the machine learning model. Based on the output from the machine learning model, the online system 102 suggests an entity type for the user to include with the search query. For example, if the online system 102 sells products and the user enters the word "shoe," the online system 102 may suggest based on machine learning model that the user limit the searching to shoes in the women's category/department.

A client device 104 is a device used by a user to communicate with the online system 102. A client device 104 may be, for example, a desktop computer, laptop, smart phone, tablet computer, or personal digital assistant (PDA). A user communicates with the online system 102 through a client device 104 to use the services provided by the online system 102. As part of the services, the user may access records stored by the online system 102. To identify a record to retrieve, a user may provide through the client device 104 a search query to the online system 102. The client device 104 receives from the online system 102 search results related to the query. Each search result identifies a record that the user can request to access. In one embodiment, a user may also use a client device 104 to provide a record to the online system 102 for storage.

The network 106 represents the communication pathways between the online system 102 and client devices 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
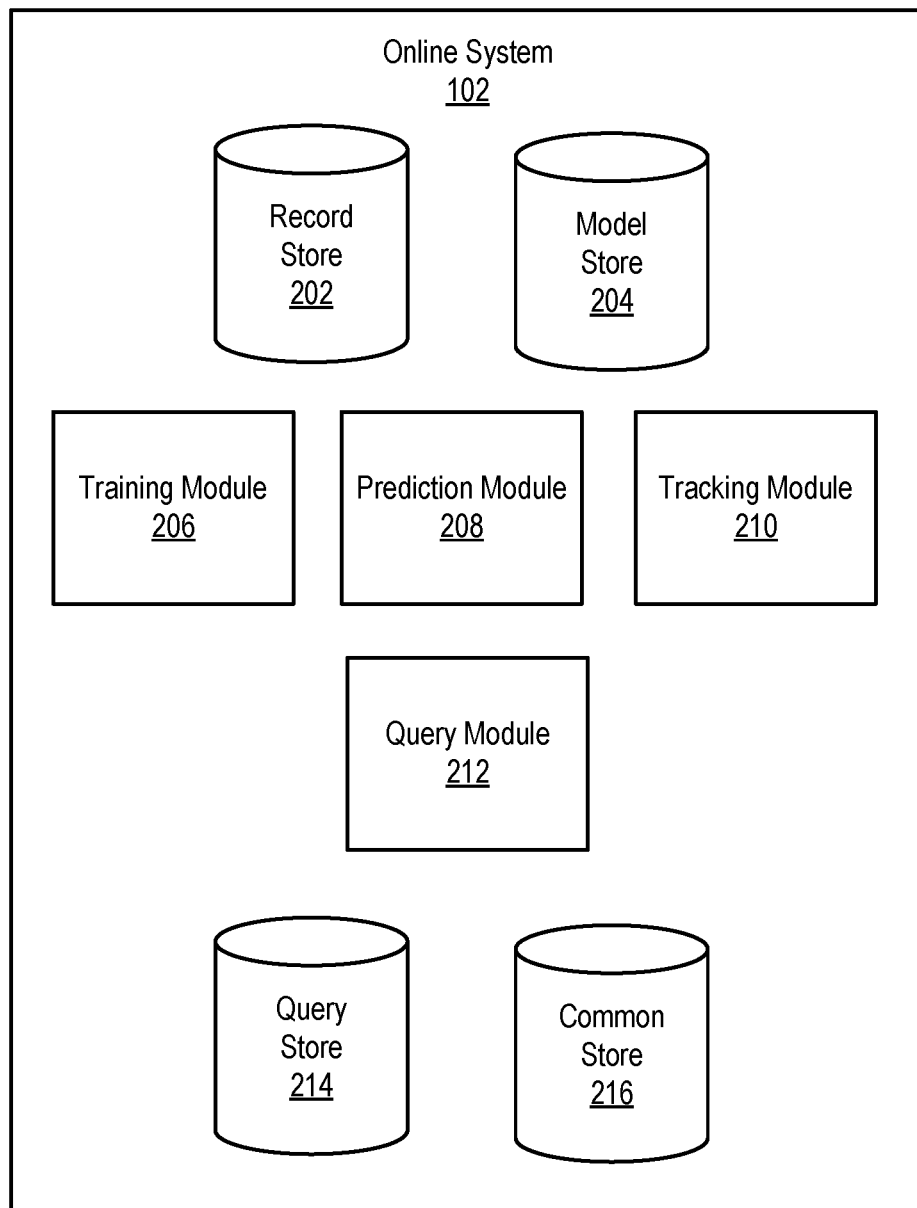
FIG. 2 is a block diagram illustrating components of an online system according to one embodiment.

FIG. 2 is a block diagram illustrating components of the online system 102 according to one embodiment. The online system 102 includes a record store 202, a model store 204, a training module 206, a prediction module 208, a tracking module 210, a query module 212, a query store 214 and a common store 216. Those of skill in the art will recognize that other embodiments can have different and/or other components than the ones described here, and that the functionalities can be distributed among the components in a different manner.

The record store 202 stores records accessible by users of the online system 102. Records may include webpages, mobile application pages, media items (e.g., videos, audio files, still images), documents, forms, social posts, presentations, spreadsheets, text files, calendar entries, tasks, and other storable objects. In one embodiment where the online system 102 is a multi-tenant system, the record store 202 stores records of multiple tenants. However, the record store 202 implements security protocols that keep the records of each tenant separate and ensures that a user is only able to access the records of a tenant with whom the user is associated. For example, if a tenant is an enterprise, an employee of the enterprise can access records associated with the enterprise but not records of other tenants. In another embodiment, the online system 102 includes multiple record stores 202. Each record store 202 includes records of one of the tenants.

Records stored by the record store 202 are associated with one or more entity types. In one embodiment, each stored record is associated with at least one entity type. As described above, an entity type associated with a record describes a characteristic of the record or a segment to which the record has been assigned. In one embodiment, where the online system 102 is a CRM system, the entity types that can be associated with a record include an account, customer, person, sales opportunity, sales lead, case, feed item, task, performance item, calendar entry, social post, and progress item. In one embodiment, upon storing a record in the record store 202, one or more entity types are automatically associated with the record, for example, based on one or more of the following: a file type, how the record was created, the user that stored the record, data included in the record, keywords of the record, and sections of the record. In another embodiment, for one or more of the records, a system administrator determines the one or more entity types to associate with the record.

The model store 204 stores at least one machine learning model trained by the training module 206 to predict an entity type of a record searched for by a user. The machine learning model receives as an input a feature vector that includes morphological and dictionary features extracted from a search query. In one embodiment, the feature vector also includes user features determined based on the user that submitted the search query. In one embodiment, for each potential entity type that can be associated with a record, the machine learning model outputs a likelihood score (e.g., a percentage) that indicates the likelihood that the search query is for a record associated with that entity type. In one embodiment, the machine learning model also outputs a likelihood score that indicates that the likelihood that the search query is not for any of the potential entity types.

For example, assume that the potential entity types are account, person, and sales opportunity. Based on a feature vector generated based on a search query, the machine learning model may output the following likelihood scores: 0.7 account, 0.1 person, 0.1 sales opportunity, and 0.1 none. These likelihood score indicated that there is a 70% likelihood that the query is for an account type record, 10% likelihood that the query is for a person type record, 10% likelihood that the query is for a sales opportunity type record, and 10% likelihood that the query is for none of the potential entity types.

In one embodiment, the machine learning model is a random forests model that is comprised of multiple decision trees. Each decision tree represents a flow chart, comprised of internal nodes, branches, and leaf nodes. Each internal node represents a test on a feature, each branch represents an outcome of a test, and each leaf node represents an entity type classification. For example, at an internal node a determination can be made as to whether the number of words in the query is greater than a threshold. If the number of words is less than or equal to the threshold, the control flow transfers to a first branch which is connected to another internal node or a leaf node. If the number of words is greater than the threshold, the control flow transfers to a second branch connected to another internal node or leaf node.

The feature vector is provided to each decision tree of the model. Each decision tree outputs a classification of an entity type for the query based on the flow through the tree (i.e., each decision tree votes for an entity type). For each of the potential entity types, the model determines a likelihood score based on the number of decision trees that voted for entity type from the total number of decision trees. In one embodiment, the likelihood score is the number of decision trees that voted for the entity type divided by the total number of decision trees of the random forests model. For example, if two out of ten decision trees voted for the person entity type, the likelihood score for the person entity type is 0.2. The random forests model outputs the likelihood scores determined for the entity types.

In one embodiment, where the online system 102 is a multi-tenant system, the model store 204 may store a different random forests model for each of the tenants. The random forests model of each tenant is trained based on training examples generated from previous search queries submitted by users associated with the tenant (e.g., employees of the tenant) as further described below with reference to the training module 206. It is beneficial to generate a random forests model for each tenant in that each tenant may have different entity types and users of each tenant may have different search behavior.

In other embodiments, the one or more models stored by the model store 204 may use a different machine learning algorithm than random forests for predicting an entity type of a record searched for by a user. For example, the one or more models stored by the model store 204 may use machine learning algorithms that include neural networks, deep learning, support vector machines, naïve Bayes, etc.

The training module 206 trains the one or more models stored by the model store 204. As described below, the query store 214 stores historical information of prior search queries processed by the online system 102. The historical information stored for a prior search query includes the search query, one or more records from the search results of the query that the respective user was interested in, and the entity types of the records. The training module 206 generates training examples for training a model based on the historical information. In one embodiment, each training example represents a search query previously processed by the online system 102. In one embodiment, where the online system 102 is a multi-tenant system and the model store 204 includes different models for different tenants, for training a model of a tenant, the training module 206 generates training examples from search queries submitted by users associated with the tenant (e.g., employees of the tenant). The generated training examples include positive and/or negative examples.

In one embodiment, for each training example, the training module 206 generates a feature vector that includes features extracted from the search query of training example. The extracted features include morphological and dictionary features of the training example's query. Morphological features describe the structure of the search query and dictionary features are determined based on the use of one or more dictionaries. The extracted morphological features include the number of words in the search query, whether the query includes an email address, whether the query is comprised of only numbers, how many digits are included in the query if the query is only comprised of numbers, and whether the query includes a mix of letters and number (i.e., whether the query is alphanumeric).

An extracted dictionary feature is the percentage of words in the search query that are found in a language dictionary. For example, the language dictionary may be an English Merriam-Webster dictionary. In one embodiment, for each word/term in the search query, the training module 206 determines whether the word is included in the language dictionary. The training module 206 divides the number of words found in the language dictionary by the total number of words included in the search query and includes the result in the feature vector. For example, if the query is "Salesforce pie" and only pie is included in the language dictionary, the training module 206 would include 0.5 in the feature vector for the feature.

Another extracted dictionary feature is the percentage of words in the search query that are names of people. For each word in the search query, the training module 206 determines whether the word is included in a name dictionary. The name dictionary includes potential names (e.g., first names or last names) of a person. The training module 206 divides the number of words found in the name dictionary by the total number of words included in the search query and includes the result in the feature vector.

The training module 206 also extracts as a dictionary feature the percentage of words in the search query that are names of business. A business is involved in providing goods and/or services to consumers. For each word in the search query, the training module 206 determines whether the word is included in a business dictionary. In one embodiment, the training module 206 also determines whether different combinations of words are included in the business dictionary. The business dictionary includes known names of business. The training module 206 includes in the feature vector the result of dividing the number of business names found in the search query by the total number of words included in the search query.

The training module 206 also extracts as a dictionary feature the percentage of words in the search query that are business suffixes. A business suffix describes the structure, type, or legal treatment of a business. For example, business suffixes may include corporation, limited liability company (LLC), partnership, limited partnership (LP), limited liability partnership (LLP), incorporated (Inc.), etc. For each word or combinations of words in the search query, the training module 206 determines whether the word or combination of words is included in a business suffix dictionary. The business suffix dictionary includes known business suffixes. The training module 206 includes in the feature vector the result of dividing the number of business suffixes found in the search query by the total number of words included in the search query.

In one embodiment, instead of including percentages in the feature vector for extracted dictionary features, the training module 206 may include other values. For example, training module 206 may include in the feature vector as dictionary features, the number of query words found in a language dictionary, the number of people names identified in the query, the number of business names identified in the query, and the number of business suffixes identified in the query.

In one embodiment, the training module 206 also includes in the feature vector user features determined based on the user that submitted the search query. In one embodiment, for each user, the online system 102 maintains information on the entity types of records that the user interacts with or searches for through the online system 102. The training module 206 includes in the feature vector the top N entity types that the user interacted with or searched for through the online system 102. N is one or greater.

The training module 206 uses training examples and the feature vectors generated for the examples to train a model to predict an entity type of a record searched for based on a search query. The trained model is stored in the model store 204. In the embodiment, where the model is a random forests model, the training module 206 trains the random forests model by growing each decision tree of the model. In one embodiment, to grow a decision tree a number of training examples are selected at random and used as the training set for growing the tree. At each node a random subset of features are selected and the best split of the features is used to split the node.

The prediction module 208 predicts an entity type of a record searched for by a user. When the query module 212 receives a search query provided by a user, the prediction module 208 generates a feature vector for the search query. Similar to the training module 206, the prediction module 208 extracts and includes in the feature vector the morphological and dictionary features of the search query. The morphological features include the number of words in the search query, whether the query includes an email address, whether the query is comprised of only numbers, how many digits are included in the query if the query is only comprised of numbers, and whether the query includes a mix of letters and numbers. The dictionary features include the percentage of words in the query found in a language dictionary, the percent of the query comprised of people names, the percent of the query comprised of business names, and the percent of the query comprised of business suffixes. In one embodiment, the prediction module 208 also includes in the feature vector user features determined based on the user that provided the search query (e.g., top entity types user interacts with or searches for).

If only a single machine learning model is stored in the model store 204, the prediction module 208 provides the feature vector to the stored model as an input. If the model store 204 includes multiple machine learning models, the prediction module 208 selects the model appropriate for the search query and provides the feature vector to the selected model as an input. For example, if the online system 102 is a multi-tenant system and the model store 204 includes a model for each tenant, the prediction module 208 selects the machine learning model of the tenant with which the user providing the search query is associated.

The prediction module 208 obtains the output of the machine learning model to which the feature vector was provided. The output indicates one or more entity types that they user is likely searching for. In one embodiment, the output includes a likelihood score for each potential entity type that can be associated with a record. The likelihood score associated with an entity type indicates a likelihood that the search query is for a record associated with that entity type. The prediction module 208 provides to the query module 212 the likelihood score output for each entity type.

The tracking module 210 tracks processed search queries and actions performed by users. For each search query received from a user, the tracking module 210 creates an entry in the query store 214 that includes the search query and a time when the search query was received. Additionally, when search results are provided by the query module 212 to the user, the tracking module 210 tracks which search results the user showed interest in. In one embodiment, the tracking module 210 determines that the user was interested in a search result if one or more of the following occurs: the user selected the search result, the user viewed/interacted with the record of the search result for longer than a set period of time, and after selecting the search result the user didn't select another search result of the query. If the user showed interest for a search result, the tracking module 210 determines based on the record store 202 the one or more entity types associated with the record of the search result. The tracking module 210 includes an identifier of the record and the one or more entity types in the entry created for the search query in the query store 214. The entry may include identifiers of multiple records if the user showed interest in multiple records when viewing the search results of the search query. The information stored in the query store 214 may be referred to as historical information.

Periodically (e.g., once a day or once a week) the tracking module 210 analyzes the entries included in the query store 214 and classifies certain search queries as common queries. In one embodiment, the tracking module 210 classifies a search query as a common query if based on the query store 214 the tracking module 210 determines that the search query was received more than a threshold number of times during a time period (e.g., more than 100 times in the past 24 hours).

For each search query that is classified as a common query, the tracking module 210 identifies the entries created for the search query in the query store 214 during the time period. Based on the identified entries, the tracking module 210 determines the entity types of the records that users showed interest in after receiving the search results for the search query. For each distinct entity type, the tracking module 210 determines a historical score that indicates how often users were interested in the entity type when submitting the search query. To determine the historical score for an entity type, the tracking module 210 determines the number of records from the identified entries that are associated with the entity type. The tracking module 210 divides the determined number by the total number of records included in the identified entries and the result is the historical score for the entity type. For example, if eight of ten records from the identified entries are associated with entity type X, the historical score for entity type X is 0.8.

The tracking module 210 stores in the common store 216 the common queries along with the historical scores determined for the respective entity types. In one embodiment, if the tracking module 210 determines that a search query included in the common store 216 is no longer a common query, the tracking module 210 removes the search query from the common store 216. In one embodiment, the common store 216 is a cache storage that can be quickly accessed.

The query module 212 processes search queries provided by users. In one embodiment, when the query module 212 receives a search query provided by a user, the query module 212 provides the search query to the prediction module 208. In response to providing the search query, the query module 212 receives from the prediction module 208 entity types and a likelihood score for each entity type. The query module 212 searches the record store 202 for records related to the search query based on the entity types received from the prediction module 208. In one embodiment, to perform the search, the query module 212 selects each entity type received from the prediction module 208 with a likelihood score above a threshold. In another embodiment, the query module 212 selects a set number of entity types with the highest likelihood scores (e.g., entity types with the three highest scores). The query module 212 searches the record store 202 for records related to the search query that are associated with at least one of the selected entity types. Hence, the query store 214 automatically narrows the search to entity types that the user is likely searching for as indicated by the likelihood scores.

The query module 212 generates search results that include the records found based on the search and transmits the search results to the client device 104 of the user for display. In one embodiment, the query module 212 ranks each record in the search results based on its relatedness to the search query and the likelihood scores of the entity types associated with the record. In one embodiment, records are ranked based on a function where the higher the likelihood score of an entity type associated with a record, the higher the rank of the record in the search results.

In another embodiment, the query module 212 does not limit the search to records associated with selected entity types. The query module 212 searches the query module 212 for records related to the search query. However, the query module 212 ranks each record in the search results based on its relatedness to the search query and the likelihood scores of the entity types associated with the record.

In one embodiment, a query received from the query module 212 is part of a query being entered by a user. For example, as a user enters a first word of query, the client device 104 of the user may provide the first word to the online system 102 using Ajax. The query module 212 provides the part of the query to the prediction module 208. The prediction module 208 selects a number of entity types based on likelihood scores received from the prediction module 208 for the part of the query. The query module 212 instructs the client device 104 of the user to update the user interface being used by the user for entering the search query to include the selected entity types. The selected entity types are included in the user interface as part of an autocomplete feature that suggests terms for the search query.

For example, if the user enters the word "dog," prior to the user entering the next word for the search query, the user may receive a suggestion to search for dog records associated with entity type X or associated with entity type Y, where the entity type X and entity type Y received the highest likelihood scores. If the user enters another term (e.g., dog ran), the query module 212 repeats the process and suggest a new set of entity types for the search query. If the user selects a suggested entity type, the query module 212 searches the record store 202 for records related to the search query and associated with the selected entity type.

In another embodiment, when the query module 212 receives a search query provided by a user, the query module 212 searches the common store 216 to determine whether it is a common query. If the query module 212 identifies the received search query in the common store 216, the query module 212 determines that the query has been classified as a common query by the tracking module 210.

If the search query is a common query, the query module 212 retrieves from the common store 216 the entity types associated with the common query and the historical score associated with each entity type. In one embodiment, the query module 212 selects a set of the retrieved entity types based on their respective historical scores (e.g., entity types with scores above a threshold or entity types with top five scores). The query module 212 searches the record store 202 for records related to the common query and associated with at least one of the selected entity types. The query module 212 transmits search results identified based on the search to the client device 104 of the user. In one embodiment, the query module 212 ranks each record in the search results based on its relatedness to the search query and the historical scores of the entity types associated with the record.

On the other hand, if the received search query is not a common query, similar to above, the query module 212 provides the search query to the prediction module 208. In response, the query module 212 receives from the prediction module 208 likelihood scores output by a machine learning model for different entity types. The query module 212 uses the likelihood scores to select one or more entity types for narrowing the search. Hence, in this embodiment, when the search query is not a common query, the query module 212 relies on a machine learning model for determining which entity types the user is likely to be interested in. However, if the search query is a common query, there is sufficient data to determine which entity types the user is likely to be interested in without having to rely on the machine learning model. Further, since the query module 212 does not have to run a common query through a machine learning model, the query module 212 is able to provide search results for common queries at an even faster speed.

FIG. 3 is a flow chart 300 illustrating operations of the online system 102 in processing a search query according to one embodiment. Those of skill in the art will recognize that other embodiments can perform the steps of FIG. 3 in different orders. Moreover, other embodiments can include different and/or additional steps than the ones described herein.

The online system 102 identifies 302 historical information describing search queries previously processed by the online system 102. The historical information for a previously processed search query describes at least one record that a user showed interest in from the search results generated for the search query and one or more entity types associated with the record. The online system 102 generates 304 training examples based on the historical information. Each training example represents a search query previously processed by the online system 102. The online system 102 trains 306 a machine learning model based on morphological and dictionary features extracted from each training example. In one embodiment, the machine learning model is a random forests model.

The online system 102 receives 308 a search query provided by a user. The online system 102 extracts 310 morphological and the dictionary features from the search query. The online system 102 predicts 312 at least one entity type that the user is searching for based on the machine learning model and the extracted features. In one embodiment, the online system 102 includes the extracted features in a feature vector and provides the feature vector to the machine learning model as an input. The online system 102 receives the output of the machine learning model which includes a likelihood score for each potential entity type. The online system 102 selects at least one entity type based on the likelihood score of the entity type. The selected entity type is the entity type of the record that the user is likely searching for.

The online system 102 generates 314 search results based on the predicted entity type. In one embodiment, the online system 102 searches for records related to the search query and associated with the predicted entity type. The records identified based on the search are included in the search results. In one embodiment, the online system 102 ranks the records in the search results based on whether they are associated with the predicted entity type. The online system 102 transmits 316 the search results to a client device 104 of the user.

Figure 4:
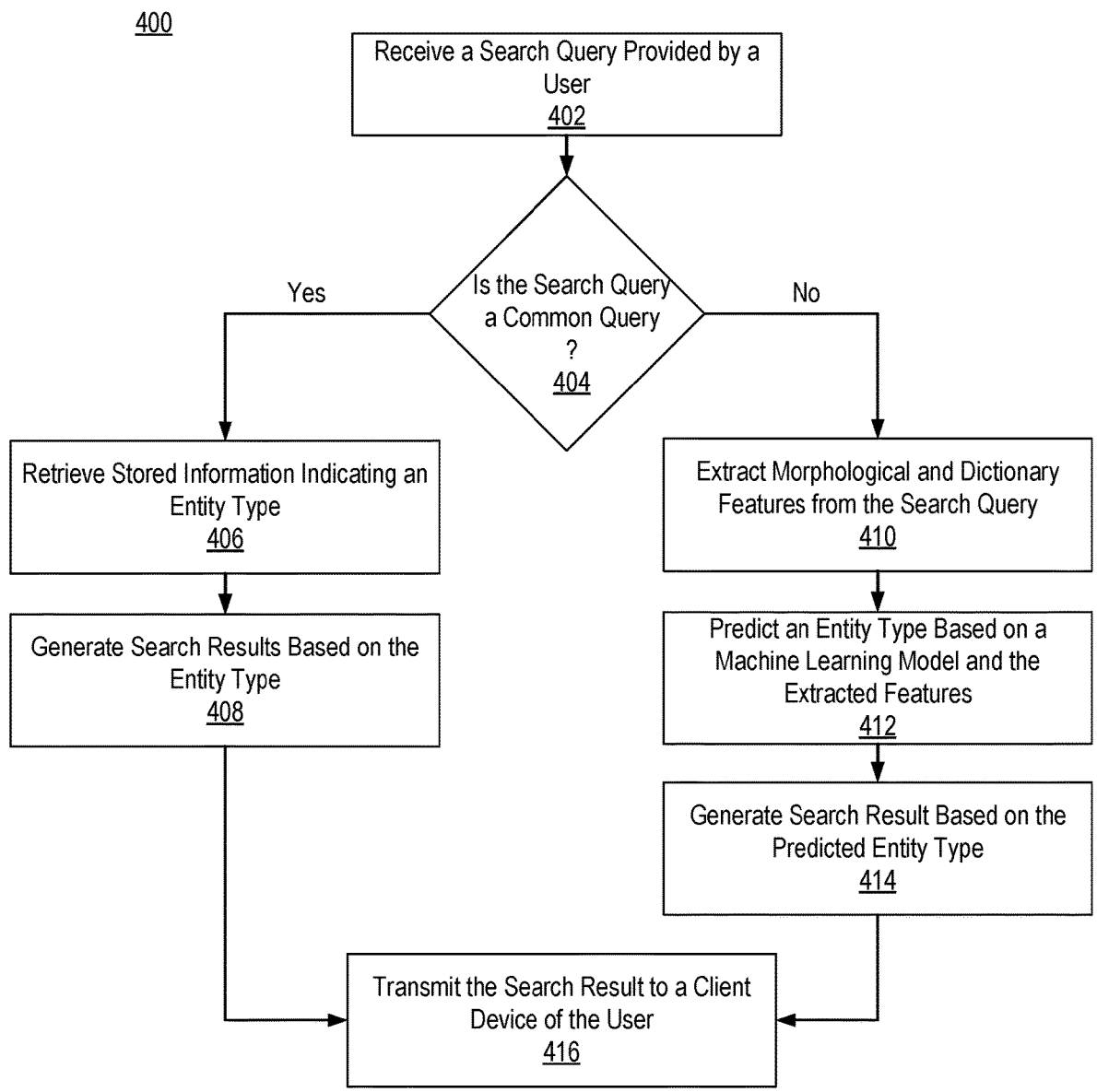
FIG. 4 is a flow chart illustrating operations of the online system in processing a search query according to another embodiment.

FIG. 4 is a flow chart 400 illustrating operations of the online system 102 in processing a search query according to another embodiment. Those of skill in the art will recognize that other embodiments can perform the steps of FIG. 4 in different orders. Moreover, other embodiments can include different and/or additional steps than the ones described herein.

Assume for purposes of this example that for search queries that have been classified as common queries, the online system 102 stores information indicating at least one entity type that users are typically searching for when they provide the search query. A search query is classified as a common query if it has been submitted to the online system 102 more than a threshold number of times during a time period. The online system 102 receives 402 a search query provided by a user. The online system 102 determines 404 whether the search query received is a common query. If the search query is a common query, the online system 102 retrieves 406 stored information indicating at least one entity type that users typically search for when they provide the search query. The online system 102 generates 408 search results based on the entity type. In one embodiment, the online system 102 searches for records related to the search query and associated with the entity type. The records identified based on the search are included in the search results. In one embodiment, the online system 102 ranks the records in the search results based on whether they are associated with the entity type.

On the other hand, if the online system 102 determines that the search query is not a common query, the online system 102 extracts 410 morphological and the dictionary features from the search query. The online system 102 predicts 412 at least one entity type that the user is searching for based on a machine learning model and the extracted features. The online system 102 generates 414 search results based on the predicted entity type. The online system 102 transmits 416 generated search results to a client device 104 of the user.

Figure 5:
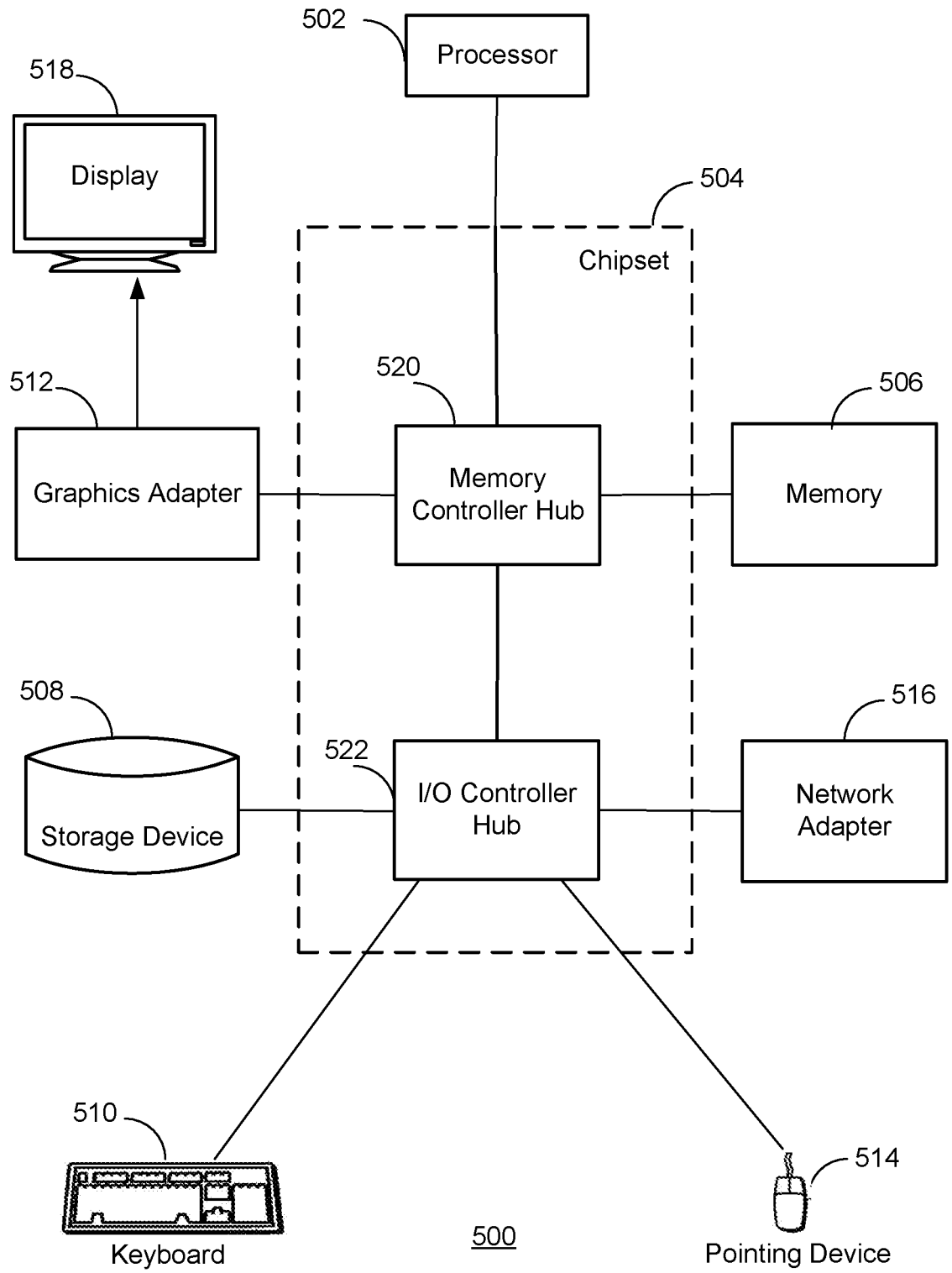
FIG. 5 is a block diagram illustrating a functional view of a typical computer system for use as one of the entities illustrated in the environment of FIG. 1 according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 200. The graphics adapter 512 displays images and other information on the display 518. The network adapter 516 couples the computer system 500 to the network 106.

As is known in the art, a computer 500 can have different and/or other components than those shown in FIG. 5. In addition, the computer 500 can lack certain illustrated components. For example, a computer system 500 acting as an online system 102 may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 104 may be a mobile phone with limited processing power, a small display 518, and may lack a pointing device 514. The online system 102, in contrast, may comprise multiple blade servers working together to provide the functionality described herein.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for processing search queries, the method comprising:
    identifying, by a storage system, a plurality of training examples, each of the plurality of training examples associated with a respective search query previously processed by the storage system;
    training, by the storage system, a machine learning model based on the plurality of training examples, the machine learning model comprising multiple decision trees, wherein each decision tree of the machine learning model receives an input a feature vector comprising morphological features and dictionary features of a search query, the morphological features describing a structure of the search query, the dictionary features describing words in the search query in at least one dictionary, and wherein the machine learning model outputs an entity score for an entity type based on a number of decision trees that voted for the entity type;
    receiving, by the storage system, a search query for records, the search query provided by a client device;
    extracting, by the storage system, one or more morphological features and one or more dictionary features from the received search query;
    providing, by the storage system to the machine learning model as an input, a feature vector including the extracted morphological features and the extracted dictionary features;
    predicting, by the storage system, an entity type searched for by the client device based on one or more entity scores for one or more entity types generated by the machine learning model according to the input feature vector;
    searching, by the storage system, for records according to the received search query and the predicted entity type; and
    transmitting, by the storage system to a client device, search results identifying records found based on the search.

2. The method of claim 1, wherein the entity score that indicates a likelihood that the received search query is for the entity type.

3. The method of claim 1, wherein the extracted morphological features include one or more of the following: a number of words in the received search query, whether the received search query includes an email address, whether the received search query is comprised of only numbers, how many digits are included in the received search query, and whether the received search query is alphanumeric.

4. The method of claim 1, wherein a dictionary feature extracted from the received search query is a value determined based on a number of words in the received search query found in a language dictionary.

5. The method of claim 1, wherein a dictionary feature extracted from the received search query is a value determined based on a number of people names included in the received search query, the people names found in a name dictionary.

6. The method of claim 1, wherein a dictionary feature extracted from the received search query is a value determined based on a number of business names included in the received search query, the business names found in a business dictionary.

7. The method of claim 1, wherein a dictionary feature extracted from the received search query is a value determined based on a number of business suffixes included in the received search query, the business suffixes found in a business suffix dictionary.

8. The method of claim 1, further comprising:
    ranking each of the records included in the search results based on the entity score for the entity type associated with the record.

9. The method of claim 1, wherein the machine learning model is a random forests model.

10. A computer implemented method for processing search queries, the method comprising:
    receiving, by a computer system, a search query for records, the search query provided by a client device;
    extracting, by the computer system, one or more morphological features and one or more dictionary features from the search query, the morphological features describing a structure of the search query and the dictionary features describing words in the search query in at least one dictionary;
    predicting, by the computer system, at least one entity type searched by applying a machine learning model to a feature vector comprising the extracted morphological features and the extracted dictionary features, wherein the machine learning model is trained on a plurality of training examples associated with a respective search query previously processed by the storage system, the machine learning model comprising multiple decision trees, wherein each decision tree of the machine learning model receives the input feature vector, and wherein the machine learning model outputs one or more entity scores for one or more entity types based on a number of decision trees that voted for each entity type;
    searching, by the computer system, for records according to the search query and the predicted entity type; and
    transmitting, by the computer system to a client device, the search results identifying records based on the search.

11. The method of claim 10, wherein the entity score indicates a likelihood that the received search query is for the entity type.

12. The method of claim 10, wherein searching for records comprises:
selecting a subset of entity types from the plurality of entity types, each entity in the subset selected based on the entity score output for the entity type;
searching for records related to the search query and associated with an entity type from the subset of entity types; and
generating search results that include records identified based on the search.

13. The method of claim 10, wherein searching for records comprises:
searching for records related to the search query;
generating search results that include records identified based on the search; and
ranking each record included in the search results based on the entity score output by the machine learning model for an entity type associated with the record.

14. The method of claim 10, further comprising:
determining whether the search query is a common query;
responsive to determining that the search query is not a common query, performing the extracting, predicting, and generating; and
responsive to determining that the search query is a common query:
retrieving stored information indicating an entity type searched for when providing the search query; and
generating search results based on the entity type indicated by the stored information.

15. The method of claim 14, wherein the search query is a common query in response to the search query having been received more than a threshold number of times during a time period.

16. The method of claim 14, wherein the stored information comprises for each of a plurality of entity types a score that indicates how often users are interested in the entity type when submitting the search query and generating search results comprises:
selecting at least on entity type from the plurality of entity types based on the entity score of the at least one entity type;
searching for records related to the search query and associated with the at least one entity type; and
generating search results that include records identified based on the searching.

17. The method of claim 10, wherein the computer system is a multi-tenant system that has access to a plurality of machine learning models and the machine learning model that receives the first feature and the second feature is selected from the plurality of machine learning models based on a tenant associated with the user.

18. The method of claim 10, wherein searching for records comprises:
instructing the client device to display the at least one entity type as a suggestion for the search query;
responsive to the user requesting to limit the search query to the at least one entity type, searching for records related to the search query and associated with the at least one entity type; and
generating search results that include records identified based on the searching.

19. A non-transitory computer-readable storage medium storing computer executable instructions that when executed by one or more processors cause the one or more processors to perform operations comprising:
receiving, by a computer system, a search query for records, the search query provided by a client device;
extracting, by the computer system, one or more morphological features and one or more dictionary features from the search query, the morphological features describing a structure of the search query and the dictionary features describing words in the search query in at least one dictionary;
predicting, by the computer system, at least one entity type searched by applying a machine learning model to a feature vector comprising the extracted morphological features and the extracted dictionary features, wherein the machine learning model is trained on a plurality of training examples associated with a respective search query previously processed by the storage system, the machine learning model comprising multiple decision trees, wherein each decision tree of the machine learning model receives the input feature vector, and wherein the machine learning model outputs one or more entity scores for one or more entity types based on a number of decision trees that voted for each entity type;
searching, by the computer system, for records according to the search query and the predicted entity type; and
transmitting, by the computer system to a client device, the search results identifying records based on the search.

* * * * *